Feb. 9, 1965  R. W. REICH  3,169,218
DRIVING SYSTEM FOR ELECTRIC CLOCKS
Filed Nov. 21, 1960  2 Sheets-Sheet 1

INVENTOR
ROBERT WALTER REICH

BY Toulmin & Toulmin
ATTORNEYS

Feb. 9, 1965  R. W. REICH  3,169,218
DRIVING SYSTEM FOR ELECTRIC CLOCKS
Filed Nov. 21, 1960  2 Sheets-Sheet 2
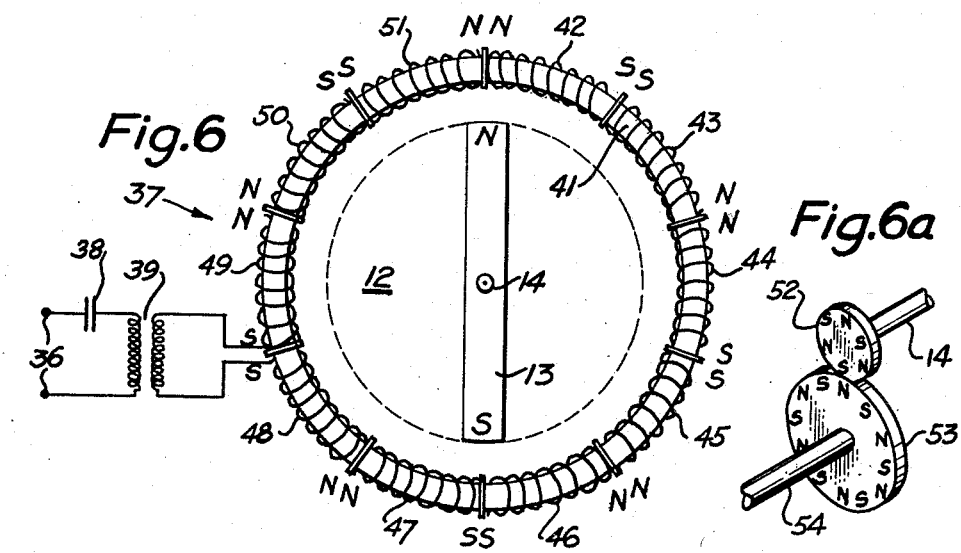
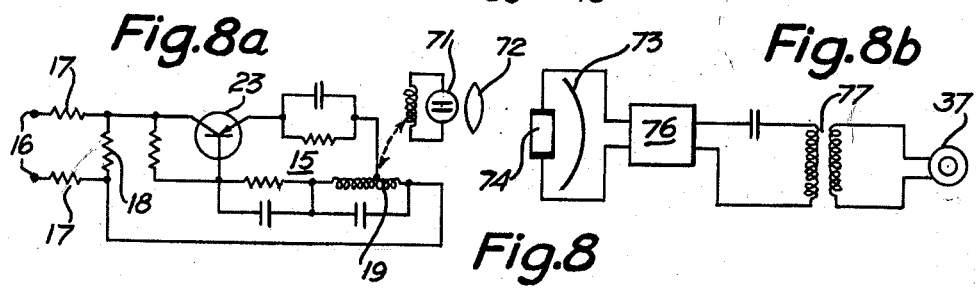
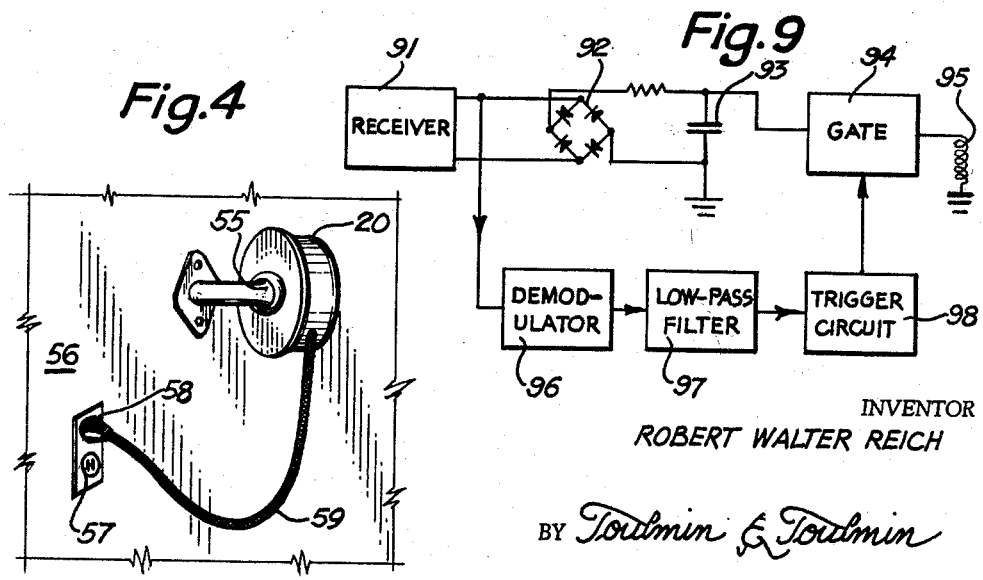
INVENTOR
ROBERT WALTER REICH
BY Toulmin & Toulmin
ATTORNEYS United States Patent Office 3,169,218
Patented Feb. 9, 1965

3,169,218
DRIVING SYSTEM FOR ELECTRIC CLOCKS
Robert Walter Reich, Rotackerstrasse 2,
Freiburg im Breisgau, Germany
Filed Nov. 21, 1960, Ser. No. 70,736
Claims priority, application Germany, Nov. 26, 1959,
R 26,799
11 Claims. (Cl. 318—16)

The present invention relates to a driving system for electric clocks to be operated in synchronism with the power line frequency; particularly with the usual line frequency of 60 cycles per second.

Electrically driven clocks are well known in the art. They usually are connected to a power line by means of a direct cable connection. However, battery driven electric clocks are also known in the art. Of course, in case the clock receives its energy from a battery, it is required to have the battery changed once in a while or to provide for a relatively frequent recharging of such battery. Accordingly, operation costs of such clock are relatively high. In addition, battery driven clocks usually are voltage and temperature dependent, particularly if transistors are employed to control the driving or impelling mechanism thereof. Such clock, furthermore, is sensitive to vibration and shocks. This is in addition to the disadvantage of having possibly the battery and the contacts used therein destructed or worn out.

Clocks connected directly to the power line are usually driven by synchronous motors. The main disadvantage of such clocks is that either they have to be positioned at a wall right where the power line is passing thereunder, or one has to install an additional extension line.

In case one does not desire to have a clock placed directly at a wall (for example a table clock, a kitchen clock, an alarm clock, etc.) such clock then can be driven from a power line directly only if there is an extension cord running across the room to the closest wall plug which may be far away. This requirement for such an extension cord is deemed to be the main reason that clocks of this type have not economically made the break through as was originally expected.

It has to be kept in mind that a synchronous motor driven clock is by far the most accurate one because the accuracy depends on the accuracy with which the power line frequency is kept constant. This power line frequency is in fact kept constant very accurately at the power station.

It has been suggested to basically use a battery for driving such clocks and to have a transmitter transmitting control signals at power line frequencies; a receiver in the clock receives these signals and controls the driving mechanism of the clock in synchronism with the power line frequency. Thus, in this case, no extension cord or any other cable connection is needed; the actual power source is positioned directly at the clock, but the accuracy is determined by the accuracy with which the frequency of the power line is kept constant. Such a device for example as disclosed in the U.S. Patent 2,786,972. Nevertheless, such a clock still requires a battery and therefore it requires all the care necessary for any battery driven apparatus. When the battery runs dead or its charge falls below a predetermined level, the clock will stop or at least will stop running accurately, and control pulses derived from the power line cannot change this. Therefore, this particular solution for a clock without an extension cord is still not a very desirable one.

It is an object of the present invention to provide a new and improved driving system for electric clocks which does not require any extension cords, but which also does not require any voltage source at the place of the clock.

It is a particular feature of the present invention that stationary with the power line is positioned and installed a modulator oscillator, preferably of the transistorized type, producing a carrier oscillation well above the power line frequency; the oscillator is driven by an unfiltered power line voltage and therefore the oscillation as produced by the oscillator is amplitude modulated with the power line frequency, usually 60 c.p.s.; a wave transmitter is connected to and driven by this oscillator; particularly a supersonic agitator, or a light source, or a radio transmitter is to be driven by the said oscillator thus transmitting supersonic waves, radio waves, or light or infrared radiation, modulated with the power line frequency; a wave receiving system is associated and combined with the clock; together with the clock the receiving system is positioned remotely from the transmitter at any place in the room, or, for example, in case of a supersonic agitator transmitter, the clock can even be positioned in another room; the receiver system includes a receiver responsive to the radiation, thus receiving the oscillations produced by the oscillator and modulated with the power line frequency; furthermore, there is provided a circuit network responsive only to the power line frequency, thus deleting the oscillator frequency; there is furthermore provided a driving mechanism for the clock, for example a synchronous motor or an impelling system operating with electro-magnetic impelling pulses to run the clock. Any of such driving mechanism for the clock receives its energy and power *exclusively* from the associated receiver. In case the energy is transmitted by means of supersonic vibrations, the receiver, of course, will be a microphone; in case radio waves are employed, the receiver will be an antenna preferably including a tuned circuit responsive to the oscillator frequency, alternatively, one can employ a hall generator responsive to the magnetic component of the radio wave whereby an additional receiver circuit is provided to electrically bias the hall generator; if the energy is transmitted by means of light or infrared radiation, there will be employed preferably a photoelement such as a silicon photoelement producing an electric voltage which is in proportion to the strength of the light as received.

The specification concludes with claims, particularly pointing out and distinctly claiming the subject matter which is regarded as the invention, however, it is believed that the invention, the object of the invention, the further objects and advantages thereof will be better understood from the following description taken in connection with the accompanying drawings in which:

FIG. 4 illustrates perspectively a mounting structure for a transmitter, for example the agitator of FIG. 2;

FIG. 6 shows schematically a preferred design for a motor to be used in a receiver system, for example, as illustrated in FIG. 5;

FIG. 6a illustrates in perspective view a magnetic gearing for such motor illustrated in FIG. 6;

FIG. 8 illustrates a specific example for a system as shown in FIG. 1, employing light rays or infra-red rays for the transmission of energy from a stationary transmitter (FIG. 8a) to a receiver (FIG. 8b) at the driving mechanism for an electric clock;

FIG. 9 illustrates a schematic circuit block diagram of a receiver being a part of any of the systems as shown in FIG. 1, particularly illustrating an impelling system for driving an electric clock.

Figure 1:
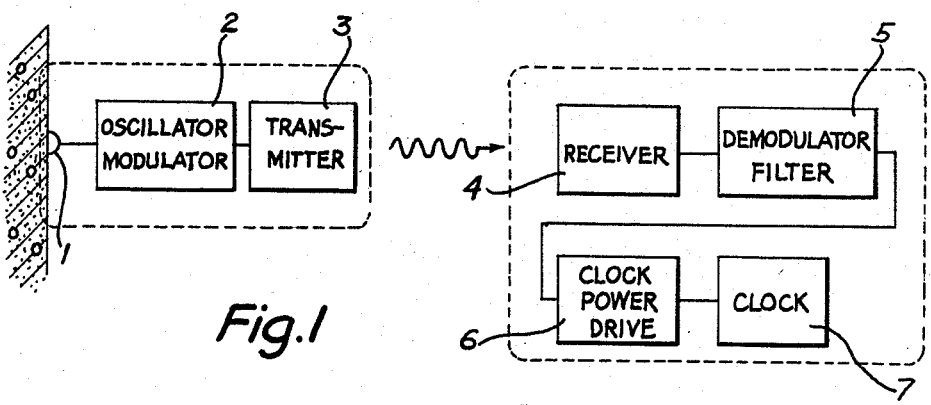
FIG. 1 is a schematic block circuit diagram of the driving system in accordance with the present invention.

In FIG. 1 is illustrated schematically a block diagram featuring a system in accordance with the present invention. Reference numeral 1 denotes a wall plug type connection with the mains or power line having, for example the usual frequency of 60 cycles per second. The electric power derived therefrom is supplied unfiltered to an oscillator 2 generating oscillations at a frequency which is well above the power line frequency. This oscillator 2 is preferably a transistor type oscillator being supplied with 60 c.p.s. alternating current voltage thus producing an output in which the oscillator frequency appears to be amplitude modulated with the power line frequency. This output as produced by oscillator-modulator 2 is then fed to a transmitter 3.

As it will become apparent later in this specification, this transmitter 3 can, for example be a sound generator, preferably a generator producing ultrasonic vibrations at oscillator frequency, modulated with the power line frequency. Alternatively, this transmitter can be a radio transmitter, transmitting the oscillator frequency as carrier with the power line frequency as intelligence signal modulator frequency or the transmitter can be a radiant source emanating light or infrared radiation the radiation of which being interrupted at oscillator frequency while the brightness varies at power line frequency. In any of these cases, waves are transmitted from transmitter 3 having a carrier frequency equal to the oscillator frequency, and the waves thus transmitted are modulated with the frequency of the power line, which will be the usual 60 c.p.s.

The elements 1, 2 and 3 are preferably combined in a unitary structure and installed in a wall usually adjacent a wall plug; this also will be explained later in connection with specific examples of the instant invention.

The elements 4, 5, 6 and 7, now to be described are combined in single, unitary structure which is associated with the clock to be driven.

Reference numeral 4 denotes a receiver adapted to receive the waves transmitter from transmitter 3. In case these waves are sonic or super-sonic vibrations, receiver 4 will be a microphone, particularly sensitive to such vibrations. If the transmitter broadcasts electro-magnetic radio waves, reciever 4 will be a radio receiver accordingly; an antenna having a tuned circuit will then be associated with receiver 4. Alternatively, receiver 4 may be a hall-generator sensitive to the magnetic component of the waves broadcasted from transmitter 3. If transmitter 3 transmits modulated light or infra-red rays, receiver 4 will primarily comprise a photosensitive element adapted to produce a voltage when subjected to the radiation from such transmitter.

It is an important feature of the instant invention that the receiver 4 does not include an additional power source for its operation, but the receiver output as produced is responsive to the received waves which waves are the sole power source for such receiver as well as the following elements. The output of the receiver 4 is demodulated in circuit element 5. This element 5 removes the oscillator frequency, which is the carrier frequency; preferably, the element 5 does not only include a demodulator but also a filter effectively blocking, for example, short-circuiting the carrier frequency. The output of element 5 thus is a voltage and a current having at least an oscillating component at power line frequency, i.e. at 60 c.p.s. This oscillating or alternating voltage or current is then supplied to a synchronous motor 6 which drives the mechanism 7 of the clock.

Figures 2, 3:
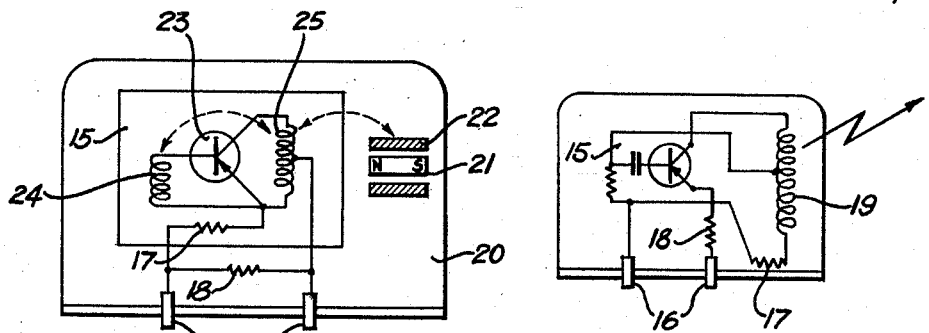
FIG. 2 illustrates schematically a supersonic agitator and includes a circuit diagram for an oscillator-modulator combined with a magnetic agitator driving system.
FIG. 3 is a modification of the device shown in FIG. 2.

Turning now to the specific embodiments with which the inventive system can be reduced to practice, in FIG. 2 is illustrated a unitary structure combining an oscillator-modulator and a sound transmitter. Reference numeral 20 denotes the schematically illustrated housing which is provided with terminals 16 to connect the circuit network therein to a conventional wall plug. Inside of housing 20 is positioned an oscillator 15 of the blocking oscillator type. This oscillator includes a transistor 23, having a collector-emitter circuit and a base-emitter circuit. The collector and emitter electrodes are interconnected via an inductance coil 25 while the base and the emitter are interconnected via an inductance coil 24. The two coils 24 and 25 are regeneratively inductively coupled. The power line input voltage taken by and from terminal 16 is applied to the transistor by means of a series resistor 17 and a parallel resistor 18.

A coil 22 is inductively coupled with coils 24 and 25, thus forming a transformer with three windings. In this coil 22 an alternating voltage is induced having basically the oscillator frequency as produced by blocking oscillator 15; this oscillation is amplitude modulated with the power line frequency as taken from the terminal 16, which is preferably 60 c.p.s. Coil 22 is that of a magnetic-type loudspeaker; coil 22 receives a permanent magnet 21 for the production of mechanical vibrations. This permanent magnet 21 is mechanically connected to housing 20, and thus housing 20 will vibrate with frequencies as transmitted from the coil 22 over the agitator magnet 21.

Housing 20 preferably is mechanically combined with the wall of the building in which the clock is to be operated. Thus, whenever housing 20 is caused to vibrate, this vibration will be transmitted to the wall itself. In view of the fact that a wall is a better conductor than air for sound and supersonic vibrations, and under consideration of the fact that the clock to be operated hangs either directly at a wall or is placed on a table or a board standing on the floor, it will be apparent that usually there will be a direct conduction of vibrations through solid material from the permanent magnet 21 via housing 20, various walls of the building, eventually through furniture and to the clock.

It will further be apparent that of course the oscillator 15 with its agitator 20 can be submerged completely into the wall so as not to be visible at all from the outside. The oscillator then is directly connected electrically to any power line cable in the wall. The particular installation of the transmitter can also be carried out, for example, in a manner similar to positioning of the transformer for the house bell. This transmitter preferably is made adaptable to any kind of apartment. Thus, it is of advantage to have the transmitter and the oscillator constructed as a single compact unit, which is, for example, provided with male plugs to be inserted in a wall plug. Alternatively, sockets can be employed similar to that of a lamp socket, and the transmitter will then be positioned accordingly.

Of course, alternatively, it is also possible to provide the transmitter with additional plugs of the wall plug type. It is a further alternative to have the transmitter constructed so as to have the form of a wall plug to be inserted (submerged) in the wall and connected electrically directly to the power line therein. On the outside only an ordinary wall plug type front plate appears visible. This front plate, for example, is the mechanical agitator when the transmitter is used as a sound or ultrasonic generator.

FIG. 4 illustrates a mode of mounting this agitator in that the housing 20 is supported by a ball and socket joint 55 secured to a wall 56 having a wall plug 57 receiving a plug 58 which is connected to agitator 20 by means of a small cord 59. The agitator 20 now can be directed so as to vibrate directly towards a clock while the wall serves additionally as sound vibration conductor.

It is advisable to employ an oscillator frequency which is conducted particularly well in and along the particular wall structure of the building in which the clock is to be operated. If, for example, the coil 25 (FIG. 2) or the coupling of coils 24 and 25 is made adjustable, the frequency with which the agitator is to be operated best can be determined upon installation. Thus, the final tuning is made after installation so that maximum possible energy will be received at the place of the clock.

Figure 5:
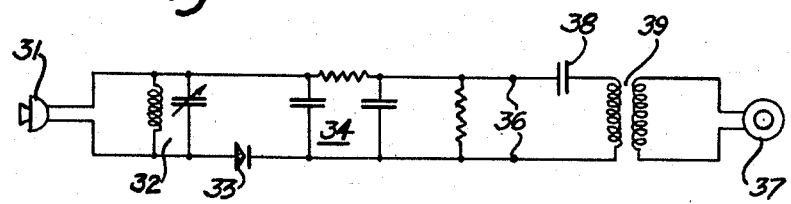
FIG. 5 is a circuit diagram illustrating a receiver system for receiving supersonic waves.

As said above, the clock must be associated with a receiver responsive to the waves as transmitted; thus, in case of an energy transmission by means of vibrations, a microphone is needed to receive the vibrations produced by the transmitter which in this case is a supersonic agitator. In FIG. 5 is shown a simple, schematic circuit diagram to be employed as receiving device. 31 is a microphone of any suitable type which is either sensitive by itself to the particular oscillator frequency as produced by the oscillator 15 in FIG. 2, or a tuned circuit 32 renders this microphone sensitive to such frequency. The detector diode 33 preferably a semiconductor diode is connected in series circuit connected to the output terminals of tuned microphone 31; the demodulated output is passed through a low-pass filter 34 and is taken from across a parallel resistor 35. At terminals 36 appears a D.C. voltage, the magnitude of which oscillates with 60 c.p.s. This voltage is inductively transmitted to a motor 37 via a transformer 39. Capacitor 38 serves as series capacitance for tuning the entire inductance of motor 37 as well as of transformer 39 to the operation frequency of 60 cycles per second, in series resonance.

Of course, this combination of demodulator-filter as illustrated can be substituted by demodulator and filter of any suitable type as illustrated are conventional apparatus and of great simplicity.

The microphone 31 is preferably in good sound conductive connection with a solid object which in turn is in good sound conductive relationship with the wall or the floor of the building having installed an agitator as shown in FIG. 2. For example, microphone 31 may be directly connected to the wall or it may be positioned in the foot of the clock standing on a shelf or a table or the like.

The motor 37 preferably is miniature motor having a high number of revolutions, for example, 3,600 revolutions per minute. In this case, the requirement for its power is very small. The clock is drivingly connected to this motor 37 via reduction gearing. Due to a high reduction of gearing ratio, very small power is required to drive an ordinary clock mechanism and such power will be a fraction of one watt.

It has to be mentioned that the drive of the clock itself can be carried out in the usual manner by tooth gears. However, in case one wants the clock to run completely noiseless the tooth gears can be substituted by a magnetic transmission gearing. This is shown in FIG. 6a. Magnetic discs 52 and 53 having permanent magnetic poles disposed along their circumference are drivingly connected by the effect of magnetism. There may be more than these two gearing discs. Disc 52 is mounted on a motor shaft 14, while disc 53 is supported on a driven shaft 54 for the clock. Such magnetic discs exhibit a driving effect similar to toothed wheels, but they do not show any kind of wear and tear, and no noise is produced.

The motor of a preferred type to be employed is illustrated in FIG. 6. This motor is substantially flat and comprises a ring 41 made of sheet iron having a very small remanence. Ring 41 has a diameter of about 1 and ⅓″ to 2″ and a width of about ½″. A plurality of toroidal shaped coils (ten), 42 to 51, are wound and positioned upon this ring 41. The coils are preferably covered with an insulating layer.

Juxtaposed coils are separated by small distance rings or spacers. These spacers are secured to ring 41 and therefore the coils have a predetermined position thereupon and also, they are equidistantly positioned with respect to each other.

Two neighboring coils are electrically connected in the series circuit connection; however, they are wound in such a manner that the current therethrough produces oppositely directed magnetic poles in the iron of ring 41. In FIG. 6 the pole distribution at 9 the particular moment is indicated by the letters N and S. Consequently, there are placed in alternating succession north and south poles in and on the ring 41. These poles have similar distances from each other which, of course, is due to the fact that the spacers are to be spaced equidistantly.

If the coil arrangement is supplied with an alternating current, the north and south poles change with a frequency equal to the frequency of the alternating current supplies thereto. The current supply network is similar to the one shown in FIG. 5 and designated with like reference numerals.

The permanent magnetic rotor 12 is mounted on a shaft 14 and is positioned inside of the inner space defined by ring 41. The air-gap between stator and rotor as described is only as small as possible; in other words, the outer edge of rotor 12 is positioned as close to the various stator coils as permissible at the tolerance of manufacturing under consideration of any possible radial deflection of the rotor during the operation thereof. The rotor 12 includes a permanent magnet 13.

A ratchet (not shown) may be provided to prevent any starting of the rotor in the wrong direction tending to run the clock counterclockwise. It is to be observed that the motor as illustrated in FIG. 6 is of the non-self starting type in order to secure simplicity and to avoid energy losses to the utmost possible degree.

The motor as illustrated has an advantage of a very low power, particularly a low current requirement due to the high reduction ratio of the gearing to be employed. The manufacturing costs of this motor are also very low because a large number of similar parts will be used for the construction and every single part is itself of a very simple structure. It is important to note that the manufacture of this motor is extraordinarily economical which is an important feature for such clocks in order to have them mass-produced at a very low price.

It is furthermore an important feature of the illustrated device particularly with regard to the relationship of the motor on one hand and the receiver on the other hand, no closed magnetic field is produced inside of the clock which would have a braking effect upon the motor. The motor has an operating voltage about 1 volt so that the input power voltage derived from the supersonic energy as effective in microphone 31 (FIG. 5) is sufficient to operate the rotor and the clock.

In case the distance between the clock to be operated and the mechanical agitator on the transmitter side still would be too large, another embodiment of the invention can be employed. This embodiment still follows the same principal pattern as outlined with reference to FIG. 1. Furthermore, basically the same elements as illustrated in FIGS. 2, 5 and 6 can be employed. However, the primary difference is that the oscillator 15 in FIG. 2, particularly the inductive output thereof, is coupled to a suitable antenna. However, it has been found that coil 25 itself can serve as transmitter antenna. Correspondingly, the microphone 31 in FIG. 5 is to be substituted by a suitable receiving antenna coupled to or incorporated in tuning circuit 32. In this case, the transmission is carried out by radio waves. Preferably, short waves of the megacycle range will be employed for this purpose. At the present time, transistors capable of handling such high frequencies at the low power used are readily available. Preferably, there will be employed an impedance matching device of conventional design in the receiver portion.

The oscillator on the transmitter side handles a power of about 10 to 20 watts. Preferably, the antenna of the particular output coil of the oscillator-modulator-transmitter device is positioned so that it can be moved in order to provide preferred direction of radiation (similar to FIG. 4). In other words, the antenna on the transmitter side shall be capable of being directionally orientated so as to radiate directly towards the clock wherever it is positioned. This, for example, can be carried out in having the housing for the transmitter circuit network mounted pivotally on the wall (FIG. 4), and index markers are provided to show which way the housing is to be positioned in order to have maximum efficiency of transmission. The transmitter, for example, can be the one shown in FIG. 3 having an inductance 19 serving also as antenna.

Figure 7:
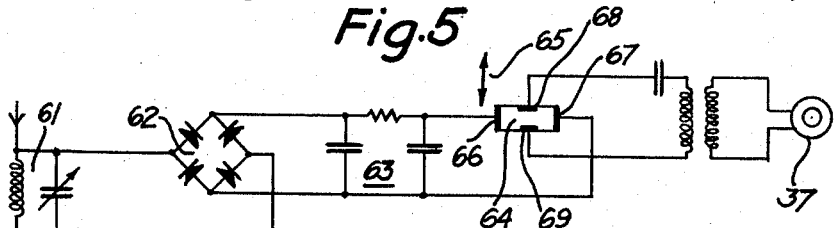
FIG. 7 illustrates a specific receiver circuit in case radio waves are employed for energy transmission for driving an electric clock, whereby a hall generator is the particular radio wave sensitive element.

FIG. 7 illustrates an alternative design for the receiver in case the energy is transmitted to the clock via radio waves. There is denoted with reference numeral 61 a tuned antenna to be combined with the clock; this tuned antenna circuit is adapted to produce maximum output at the oscillator frequency as produced by the oscillator on the transmitter side. Rectifier 62 is connected to circuit 61 and rectifies the output thereof; a low pass filter 63 preferably produces a modulated direct current, the amplitude of which oscillating at power line frequency, i.e. 60 c.p.s. The filter output can be taken from electrodes 66 and 67. There is provided a hall generator 64 which preferably is mounted pivotally in or on the clock to be operated. The hall generator 64 is thereby oriented so that it assumes position which is perpendicular to the direction of oscillation of the magnetic component of the radio waves broadcasted from the transmitter. This direction is denoted (simplified) with arrow 65. The electrodes 66 and 67 pertain to the hall generator and feed the oscillating direct current thereto as electrical bias.

In the device as shown, the electrical bias of the hall generator has to be in phase with the modulator frequency of the magnetic component effective as magnetic crossfield. Thus, it might be necessary to insert a phase shifter in any of the circuit lines provided by elements 61, 62, 63 and 66, 67.

Alternatively, a filter can be connected to rectifier 62 completely removing any alternating component from the rectifier output and providing for a smooth D.C. voltage across electrodes 66 and 67.

Electrodes 68 and 69 derive a D.C. current with oscillating amplitude from the hall generator and the alternating component thereof is then fed to the motor 37 which is again preferably of the type illustrated in FIG. 6.

FIG. 8 illustrates another embodiment of the instant invention with a transmitter portion (FIG. 8a) and a receiver portion (FIG. 8b). FIG. 8a is a circuit diagram of, first, a transistorized self-sustaining oscillator having a tuned circuit 19. The output of this oscillator feeds current to a lamp 71 producing a light radiation the brightness of which oscillates in accordance with the oscillator frequency, modulated with the frequency of the power line. It will be observed, that in this case the oscillator frequency may still be in the low frequency range (kilocycles or below) in order to have the lamp, preferably a glow discharge lamp, follow the brightness oscillations. An optical system denoted with reference number 72 collects the light and directs it toward the clock.

The receiver circuit network is shown in FIG. 8b, it employs as a receiver or detector a photo-element 74. A mirror 73 is provided for directing the light coming from the receiver, to photo-element 74 which preferably is a silicon photo-element. In case the brightness amounts to 10,000 watts, such silicon photo-elements produce voltage of about .5 volt at a current of 10 ma. The power thus obtained is already sufficient to operate the clock; however, one can, of course, employ several of such photo-elements connected so as to provide a series and parallel circuit network thus increasing the detected and received power.

It has been found as of high advantage if the lamp 71 in FIG. 8a produces a radiation having at least a preferred band in the infrared range, or this lamp may even be a substantially exclusive infrared radiator. This is of advantage because silicon photo-elements operate most efficient in the infrared range.

It has to be observed that any daylight which is also, of course, detected by the photo-element 74, has no effect in the receiver circuit because only the alternating component of any radiation received is in fact employed.

The output of photo-element 74 is demodulated by a simple demodulator, for example a diode 74; the carrier oscillator preferably is removed therefrom by the filter 76 and a tuned circuit 77 including the motor such as 37 illustrated in FIG. 6, complete this circuit.

FIG. 9 illustrates still another embodiment of the invention. There exist clocks which operate, in general, with an impelling mechanism; in other words, in clocks of such type the driving energy to be transmitted to the hands of the clock is derived from discrete driving pulses. The principle of the invention may also be employed for such clocks, and this is illustrated in FIG. 9.

In FIG. 9 there is a receiver 91 which may be of any kind illustrated in the previously described embodiments. The output of the receiver is first supplied to rectifier 92 which may include a high ohmic impedance. The rectifier is connected to a capacitor 93 for charging it. The rectifier 92 may also incorporate an impedance matching circuit in which a low input impedance, if any, is converted to a high output impedance. This can be carried out, for example, by a self-biased transistor circuit. There is further provided a discharge control switch 94 of any suitable kind, for example, a gating circuit. When gated, the capacitor 93 is discharged through a driver coil 95 which pushes or impels the clock.

The output of receiver 91 is furthermore fed to a demodulator 96 of any suitable, conventional type, separating the power line frequency from the oscillator frequency as discussed with reference to the previous embodiments. The output of the demodulator 96 is fed through a low pass filter 97 permitting passage only of the power line frequency, and the output of the low pass filter 97 is used for energizing a trigger circuit 98 feeding trigger pulses to the capacitor discharge control switch or gating circuit 94 whereby the discharge of the capacitor 93 is carried out in synchronism with the power line frequency.

Trigger circuit 98 is of conventional design. If, for example, the gating circuit 94 is a bistable flip flop, circuit 98 then is to produce pulses out of the output of filter 97, at a rate of twice the power line frequency for successively opening and closing the gate. Pulse shapers for the purpose are numerous in the art and need no further explanation. One could, for example, employ as trigger circuit a two-way rectifier, the inverted output of which being fed via a saturable transformer to the gating circuit 94.

The driver coil 94 thus receives driving or impelling pulses which are directly in synchronism with the power line frequency.

It has been found that it is possible to additionally use a fraction of the power stored in the capacitor 93 to keep charged a small battery of the rechargeable type. Such a battery could be permanently connected into the circuit and can be used in case of a power line failure to continue to drive the clock. Of course, in this case, there would not be present any trigger pulses from trigger circuit 98, however, as it will be apparent, there can be provided an additional oscillator to be connected to the emergency battery as well as to the capacitor 93. In that case, the emergency power supply is permanently connected in parallel to the trigger circuit 98 and runs in synchronism therewith, taking over in case of a power line failure.

It is also possible in any of the embodiments shown, to employ additional circuits for driving clocks, bells, etc. In this case, it is preferred to always use an additional capacitor such as 93 storing energy over a fairly long period of time, sufficient to operate a bell. The discharge of such capacitor then would be triggered by the clock itself.

As a particular advantage of the instant invention, it has to be noted that any energy transmission from the fixed power line to the clock as described above can be carried out indefinitely long. Such clock can be operated practically indefinitely without requiring any particular care during operation. No substitution of parts subject to any wear and tear is needed. The housing of the clock need not necessarily be made of a plastics or synthetics, but metal can be used because no connection to ground is needed.

The clock provided and operated in accordance with the principles of the present invention does not need a cord, particularly no extension cord for any connection to the power line. There is absolutely no restriction as to where the clock can be positioned in any room.

The invention is not limited to the embodiments described above but all changes and modifications thereof not constituting departure from the spirit and scope of the invention are intended to be covered by the following claims.

I claim:

1. A driving system for electric clocks to be operated in synchronism with the frequency of a power line comprising: a modulator oscillator having terminal means adapted to be connected to said power line and producing oscillations of a frequency above the line frequency in the supersonic range, said oscillator further including circuit means responsive to unfiltered, alternating current from said power line whereby said oscillation of supersonic frequency is amplitude modulated with the line frequency; an agitator electrically connected to said oscillator and driven therefrom, producing supersonic vibrations; a supersonic receiver responsive to said vibrations at supersonic frequency, a demodulator network connected to said receiver responsive to said modulator-power line frequency, and driving means for said clock responsive to said power line frequency as appearing at the output of said modulator, and deriving its energy exclusively from said receiver, said receiver, said driving means and said demodulator network being associated with said clock and being positioned remotely from said agitator.

2. A driving system as set forth in claim 1, said agitator being a housing containing said oscillator, said oscillator having an output coil and a permanent magnet connected to said housing and being agitated electromagnetically by said coil.

3. A driving system as set forth in claim 2, said housing being pivotally mounted on a wall of a building.

4. A driving system for electric clocks to be operated in synchronism with the frequency of a power line comprising: a modulator oscillator having terminal means adapted to be connected to said power line and producing carrier oscillations of a frequency above the power line frequency when being supplied with unfiltered alternating current from such power line via said terminal means whereby said oscillation is modulated with the power line frequency; a wave transmitter connected to and driven by said oscillator; a receiver circuit network associated with an electric clock positioned remotely from said transmitter and including, a receiver responsive to the oscillations as transmitted by said wave transmitter, a rectifier connected to said receiver, a capacitor connected to said rectifier and being charged therefrom, a capacitor discharge control switch connected to said capacitor, a driving coil for an impelling system for the clock to be connected to such discharge control switch and being supplied with energy from said capacitor via said discharge control switch, and a trigger circuit connected to said receiver and adapted to open said discharge control switch in synchronism with said power line frequency.

5. A driving system for electric clocks to be operated in synchronism with the frequency of a power line comprising a continuously operated oscillator having a frequency above the audio frequency range and at a frequency not higher than frequencies that can be attained by transistor circuits, means modulating said oscillator by the supplied line frequency, an electromagnetic wave transmitter connected to and driven by said modulated oscillator, a receiver circuit network associated with an electric clock, said network and clock remotely positioned from said transmitter, said network and clock including a receiver responsive to the said modulated oscillator frequency, a demodulator filter to produce said line frequency to drive a synchronous motor and being supplied with energy only therefrom.

6. A driving system for electric clocks as set forth in claim 5 said synchronous motor comprising a closed ring of sheet iron, a plurality of toroidally shaped coils positioned in equi-distant relationship on said ring, a permanent-magnetic rotor positioned in the inner space of said ring, said coils producing alternating magnetic poles on said ring and being connected to said receiver.

7. A driving system as set forth in claim 5, further including, a disc drivingly connected to said motor and having magnetic poles arranged on its circumference, and another disc of similar type cut of different diameter magnetically coupled to said first disc and being driven thereby, said second disc being connected to the clock.

8. A driving system for electric clocks to be operated in synchronism with the power line frequency comprising: a modulator transistor oscillator constituting a transmitter for continuously producing and transmitting electromagnetic carrier oscillations at a frequency above the audio frequency range, and at a frequency not higher than frequencies that can be attained by transistor circuits, said oscillator having terminal means adapted to be connected to a power line for being supplied with alternating current whereby said oscillation is modulated at power line frequency; receiver means positioned remotely from said transmitter and being responsive to said electromagnetic oscillations as modulated with line frequency; a rectifier connected to said receiver means; and a line frequency impelling means for an electric clock connected to said rectifier and being supplied therefrom only with energy as received by said receiver.

9. A driving system for electric clocks to be operated in synchronism with the power line frequency comprising: a modulator transistor oscillator having treminal means adapted to be connected to said power line and producing continuously carrier oscillations having a frequency above the audio frequency range and at a frequency not higher than frequencies that can be attained by transistor circuits; means for modulating said oscillation with the power line frequency; radio wave transmission means connected to said oscillator and adapted to transmit electromagnetic radiation at said oscillation as produced by said oscillator and modulated with said power line frequency; a receiver responsive to said oscillation and including circuit means responsive to said power line frequency; a rectifier connected to said receiver; and driving means for driving said clock and being individually connected to said circuit means and said rectifier and deriving its energy exclusively from said receiver, said receiver with said circuit means, said rectifier and said driving means being positioned remotely from said radio wave transmission means and being associated with said clock.

10. A driving system as set forth in claim 9, said circuit means including a hall generator responsive to the magnetic component of said electromagnetic wave as transmitted by said transmitter; means for connecting said rectifier to said hall generator for supplying direct current voltage thereto; and means for deriving an alternating current voltage of line frequency from said hall generator.

11. A driving system for electrically impelled clocks comprising: a transistorized blocking oscillator having terminal means adapted to be connected to the power line and continuously producing oscillations having a frequency well above said power frequency but being modulated therewith; an electromagnetic wave transmitter connected to and driven by said oscillator; a receiver circuit network associated with an electric clock and positioned remotely from the transmitter and including a receiver responsive to said electromagnetic waves; a rectifier connected to said receiver; a capacitor connected to said rectifier; impelling means for said clock including a D.C. operated driver coil connected to said capacitor and being supplied with energy only from said receiver through said rectifier; and means for periodically unidirectionally discharging said capacitor through said driver coil.

References Cited in the file of this patent
UNITED STATES PATENTS

| | | |
|---|---|---|
| 2,435,423 | Clapp | Feb. 3, 1948 |
| 2,777,057 | Pankove | Jan. 8, 1957 |
| 3,047,783 | Van Oort et al. | July 31, 1962 |

FOREIGN PATENTS

| | | |
|---|---|---|
| 549,643 | Canada | Dec. 3, 1957 |